(12) United States Patent
Celli

(10) Patent No.: US 6,945,545 B2
(45) Date of Patent: Sep. 20, 2005

(54) MULTI FUNCTION HAND TRUCK

(76) Inventor: Giuliano Celli, 95 Wakeline Court, Woodbridge, Ontario (CA), L4L 1A9

( * ) Notice: Subject to any disclaimer, the term of this patent is extended or adjusted under 35 U.S.C. 154(b) by 0 days.

(21) Appl. No.: 10/347,939

(22) Filed: Jan. 22, 2003

(65) Prior Publication Data

US 2004/0140638 A1 Jul. 22, 2004

(51) Int. Cl.$^7$ ................................. B62B 1/04
(52) U.S. Cl. ................ 280/47.18; 280/47.21; 280/47.23; 280/47.26; 280/47.27
(58) Field of Search ............ 280/47.18, 47.17, 280/47.21, 47.23, 47.26, 47.24, 47.27, 47.29, 47.31, 43, 43.11, 43.17, 43.24, 652, 653, 659

(56) References Cited

U.S. PATENT DOCUMENTS

| | | | | | |
|---|---|---|---|---|---|
| 1,475,785 | A | * | 11/1923 | Bergstrom | 280/47.18 |
| 1,965,944 | A | * | 7/1934 | Dudley | 280/38 |
| 2,096,994 | A | * | 10/1937 | Millen | 280/38 |
| 2,606,771 | A | * | 8/1952 | Rehnberg | 280/42 |
| 2,607,606 | A | * | 8/1952 | Millen | 280/43.1 |
| 2,717,161 | A | * | 9/1955 | Orr | 280/655 |
| 3,063,730 | A | * | 11/1962 | Domoradzki | 280/47.21 |
| 3,350,797 | A | * | 11/1967 | Dassinger et al. | 37/241 |
| 3,642,301 | A | * | 2/1972 | Crawford | 280/47.12 |
| 3,743,312 | A | * | 7/1973 | Gibbons | 280/47.18 |
| 3,844,431 | A | * | 10/1974 | Crawford | 414/490 |
| 3,888,501 | A | * | 6/1975 | McChesney | 280/47.18 |
| 4,227,709 | A | * | 10/1980 | Gradwohl et al. | 280/47.11 |
| 4,341,393 | A | * | 7/1982 | Gordon et al. | 280/47.26 |
| 4,570,961 | A | * | 2/1986 | Chateauneuf et al. | 280/47.18 |
| 4,681,330 | A | * | 7/1987 | Misawa | 280/47.2 |
| 4,762,333 | A | * | 8/1988 | Mortenson | 280/43.1 |
| 5,042,827 | A | * | 8/1991 | Mortenson | 280/5.22 |
| 5,118,124 | A | * | 6/1992 | Storay et al. | 280/47.21 |
| 5,160,153 | A | * | 11/1992 | Zan | 280/43.1 |
| 5,601,298 | A | * | 2/1997 | Watanabe | 280/47.31 |
| 5,716,183 | A | * | 2/1998 | Gibson et al. | 414/451 |
| 5,738,480 | A | * | 4/1998 | Butzen | 414/490 |
| 5,810,543 | A | * | 9/1998 | Hall | 414/490 |
| 6,053,515 | A | * | 4/2000 | Kelley | 280/47.18 |
| 6,059,512 | A | * | 5/2000 | Kielinski | 414/490 |
| 6,135,466 | A | * | 10/2000 | Irwin | 280/47.28 |
| 6,419,244 | B2 | * | 7/2002 | Meabon | 280/47.27 |
| 6,474,930 | B1 | * | 11/2002 | Simpson | 414/490 |
| 6,637,761 | B1 | * | 10/2003 | Boettcher | 280/47.24 |

* cited by examiner

*Primary Examiner*—Christopher R. Ellis
*Assistant Examiner*—Jeff Restifo

(57) ABSTRACT

A multi-function hand truck is convertible to allow lifting of a load at a spaced distance from the truck and/or is convertible for use as a wheelbarrow. A pair of lifting arms co-operate with the frame of the hand truck to extend outwardly therefrom and allow the frame of the hand truck to provide a mechanical advantage for lifting. The wheels of the truck are moveable rearwardly for conversion to a wheelbarrow mode. An open top container is positioned within the frame of the hand truck for receiving material. The multi-function hand truck is efficiently stored in a vertical orientation.

1 Claim, 15 Drawing Sheets

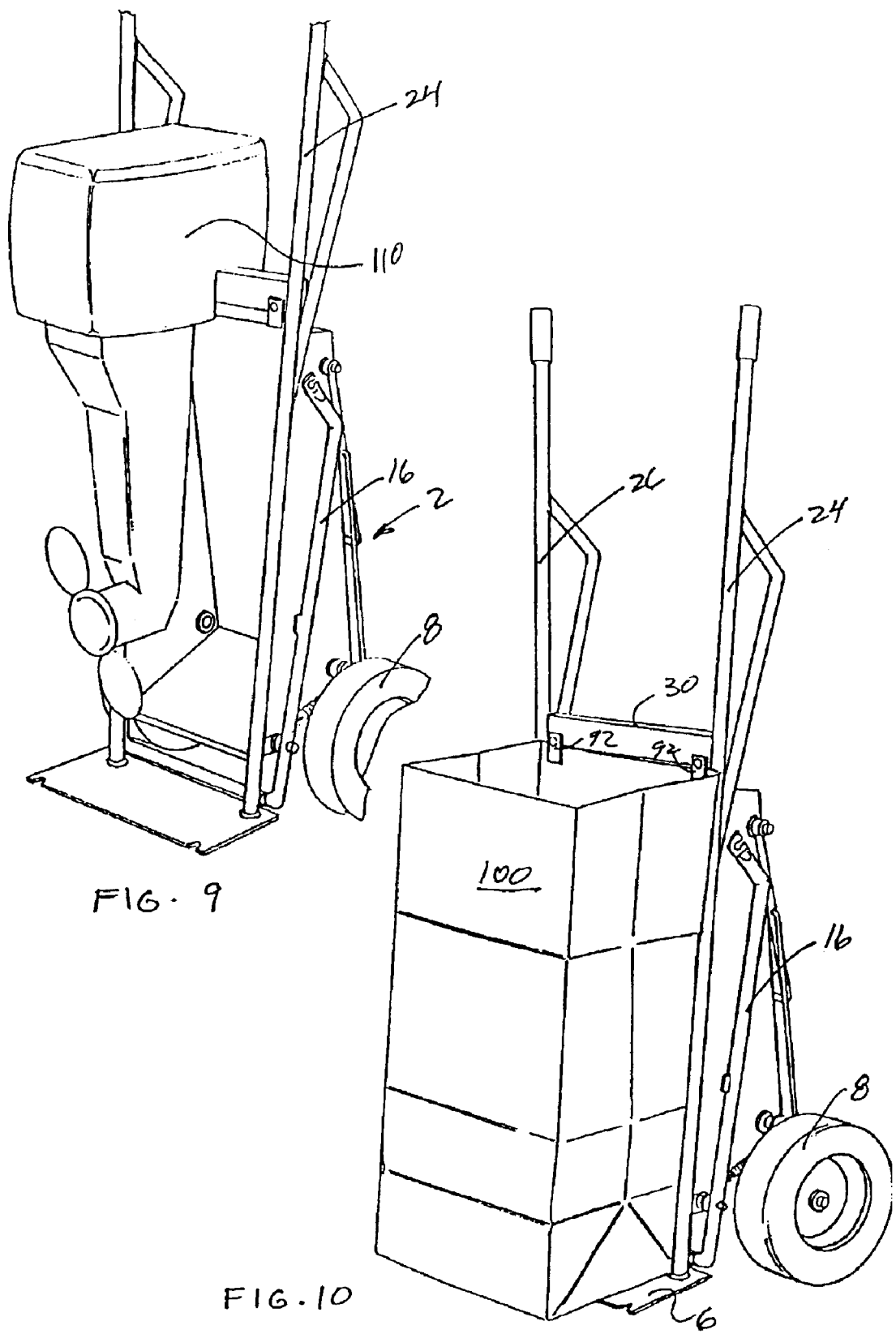

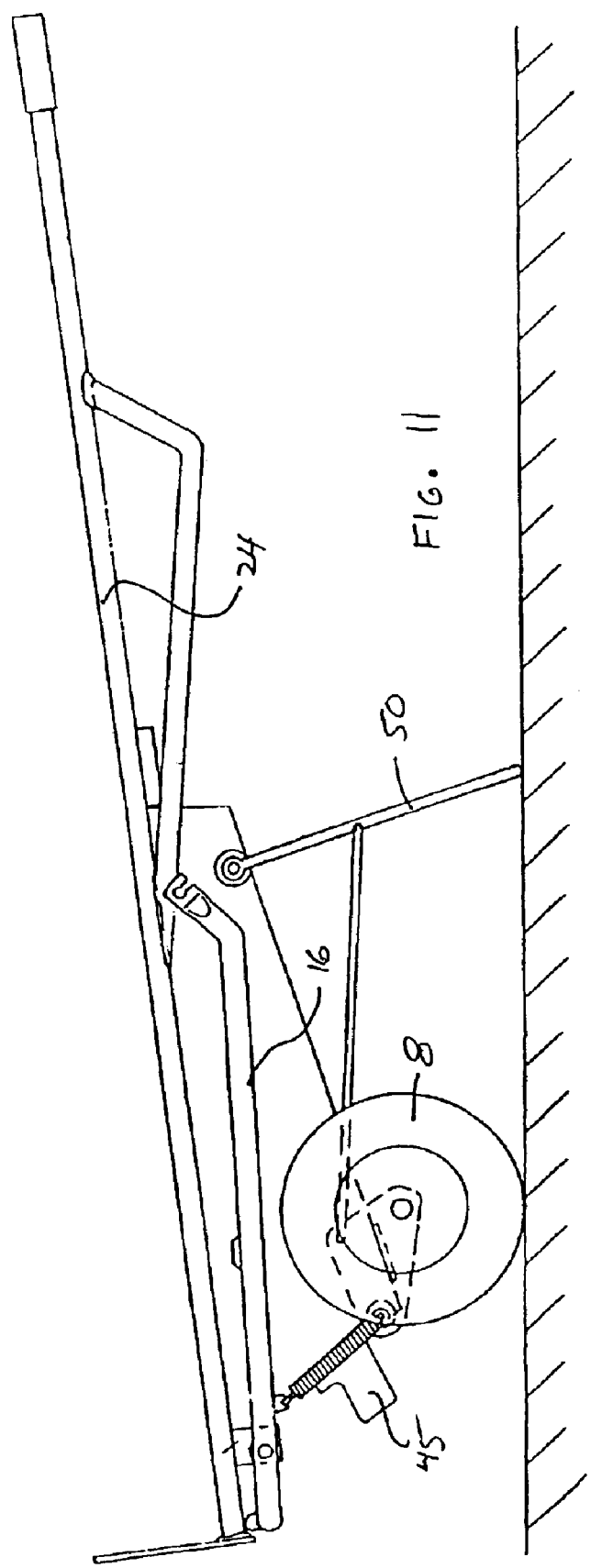

MULTI FUNCTION HAND TRUCK

FIELD OF THE INVENTION

The present application is directed to hand trucks used to move a variety of items. In particular, the invention relates to an improved hand truck having a series of operating modes.

BACKGROUND OF THE INVENTION

Two wheeled hand trucks are commonly used for moving of refrigerators, stoves, boxes and other items. These hand trucks typically have an upright frame with two wheels located near the base of the frame and slightly rearwardly thereof. Handles are provided at an upper portion for tipping of the frame once the load has been secured. A projecting plate is provided at the bottom of the frame for placing of the load thereon. In some cases the load can be merely tipped onto the frame or in other cases straps are used to secure the load to the frame such that it tilts with the truck.

These hand trucks come in various sizes and qualities and have a primary use in association with delivery services such as the delivery of boxes.

Attempts have been made to make hand trucks of this type suitable for other purposes and some of these hand trucks have removable handles and an extra set of wheels on the frame. The truck can then be converted to a four wheeled wagon type structure for supporting packages or boxes.

The structure of the present invention allows the hand truck to be used in a host of different applications. In the preferred embodiment the hand truck operates in at least three distinct modes however operation in either of these additional modes is also valuable.

SUMMARY OF THE PRESENT INVENTION

A convertible wheeled device for carrying a load according to the present invention comprises an elongate frame with a pair of handles extending from one end of the frame and a pair of wheels pivotally secured either side of the frame at an end thereof opposite said handles. The wheels are movable between a first operating position where the wheeled device is self supporting in a vertical orientation of the frame and a second position where the frame is at an angle to a support surface and the wheels have moved rearwardly away from the end of said frame opposite the handles.

According to an aspect of the invention, the wheeled device is a hand truck with a support plate extending from the frame at the end opposite the handles.

According to a further aspect of the invention, the wheeled device includes a load carrying cavity member interior to the frame and behind the frame.

In a further aspect of the invention, the device includes a control linkage for moving of the wheels between the first and second positions.

In yet a further aspect of the invention, a control linkage is provided for moving of the wheels between said first and second positions and the control linkage forms a support leg arrangement rearwardly of said Wheels to form a wheelbarrow type device.

In a preferred aspect of the device, the control linkage is an over center linkage having a bias maintaining the linkage in the first operating position unless moved by a user to cause the wheels to move towards the second position.

In a different aspect of the invention, the wheels are movable to said second position after a load has been positioned on said support plate and in said second position the force of said load is primarily carried by said frame.

In a preferred aspect of the device, in the second position, said device can act as a modified hand truck for carrying of loads to a front side of said frame and can act as a wheelbarrow with a load being supported in an open top container located behind said frame with the open top of said container being accessible through said frame.

In a different aspect of the device, a pair of lifting arms is provided. The lifting arms are movable to a position forwardly of said frame for suspending a load between said support arms as said handles are moved downwardly causing said arms to rise and suspend the load therebetween.

Preferably the lifting arms are interconnected and pivotally secured to said wheeled device adjacent said end of said frame opposite said handles.

In a further aspect of the device, the lifting arms include a bias arrangement urging said arms to a storage position generally parallel to said frame.

According to an aspect of the device, a chain and belt lifting arrangement is provided. The belt is adjustable for securing about a periphery of an object to be lifted and the belt includes two chains for engagement with said lifting arms.

In a preferred embodiment, the device is a wheelbarrow which is storable in a vertical orientation with said frame upright with said wheels in said first position. The wheelbarrow in said second position of said wheels is generally in a horizontal orientation of said frame with foldable legs extending downwardly relative to said frame.

In a preferred aspect, the foldable legs are part of a control linkage connected to and controlling the position of said wheels.

In a different aspect of the invention, the device is a hand truck operable in a conventional manner with the wheels in the first position. With the wheels in said second position, the hand truck supports a load positioned adjacent the end of the frame opposite the handles in a counterbalanced manner.

BRIEF DESCRIPTION OF THE DRAWINGS

Preferred embodiments of the invention shown in the drawings wherein;

FIG. 9 is a partial perspective view showing a multi purpose hand truck acting as a storage truck for an outboard motor;

FIG. 10 is a perspective view showing a multi purpose hand truck being used to support a bag for containing yard waste;

FIG. 11 is a side view of the multi purpose dolly in the wheelbarrow position;

DETAILED DESCRIPTION OF THE PREFERRED EMBODIMENTS

Figure 1:
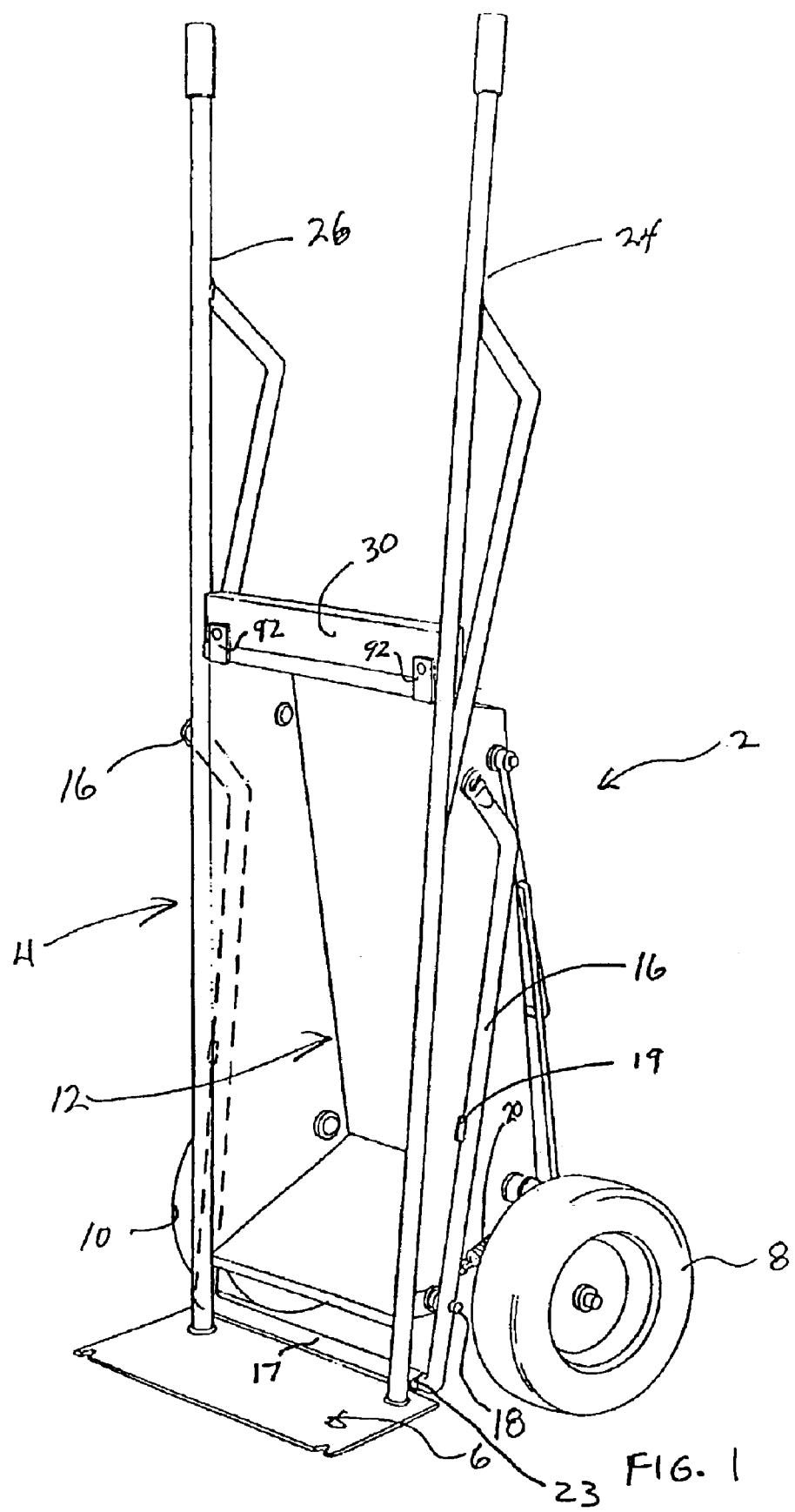
FIG. 1 is a partial perspective view of the multi purpose hand truck.
Figure 2:
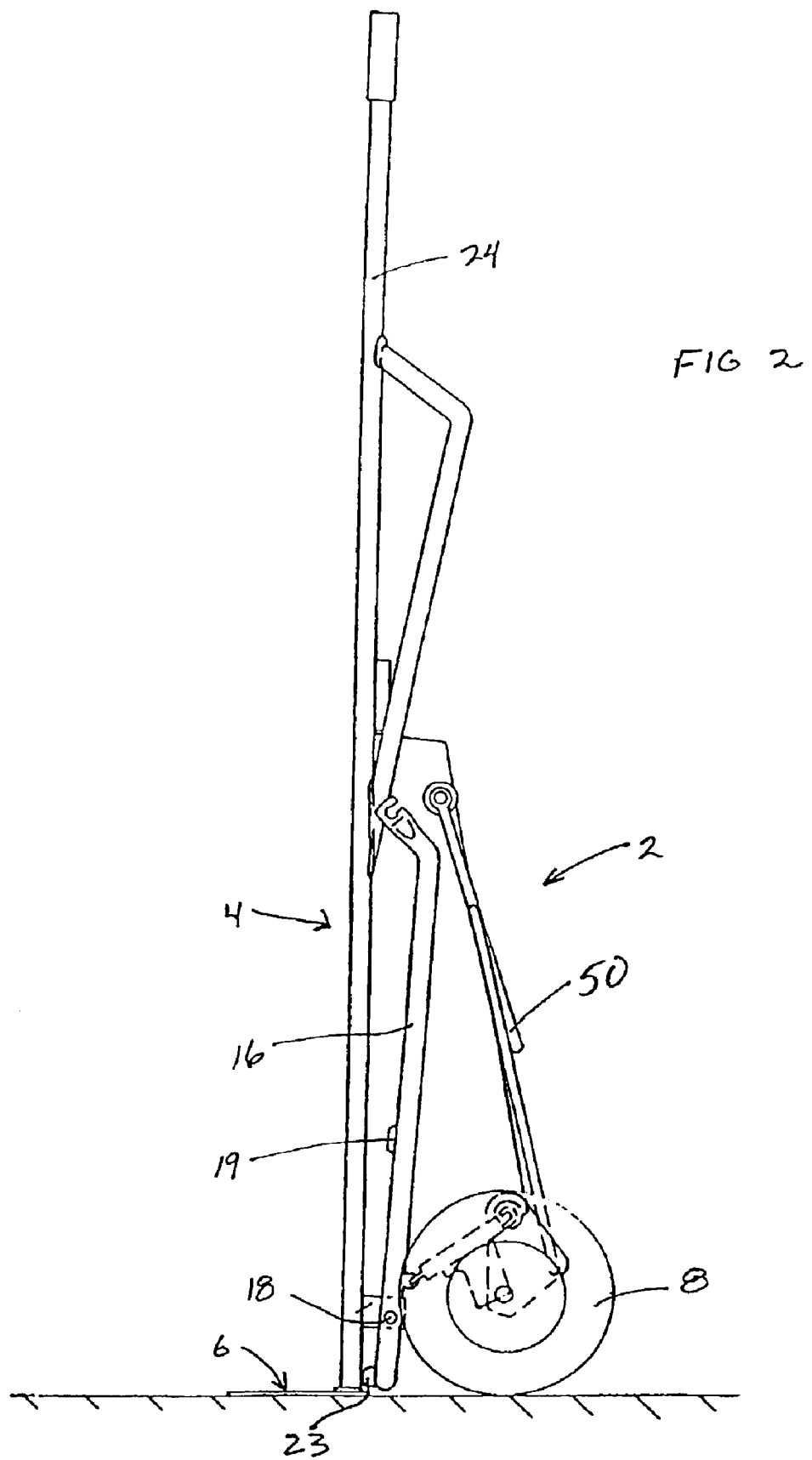
FIG. 2 is a side view of the multi purpose hand truck.
Figure 3:
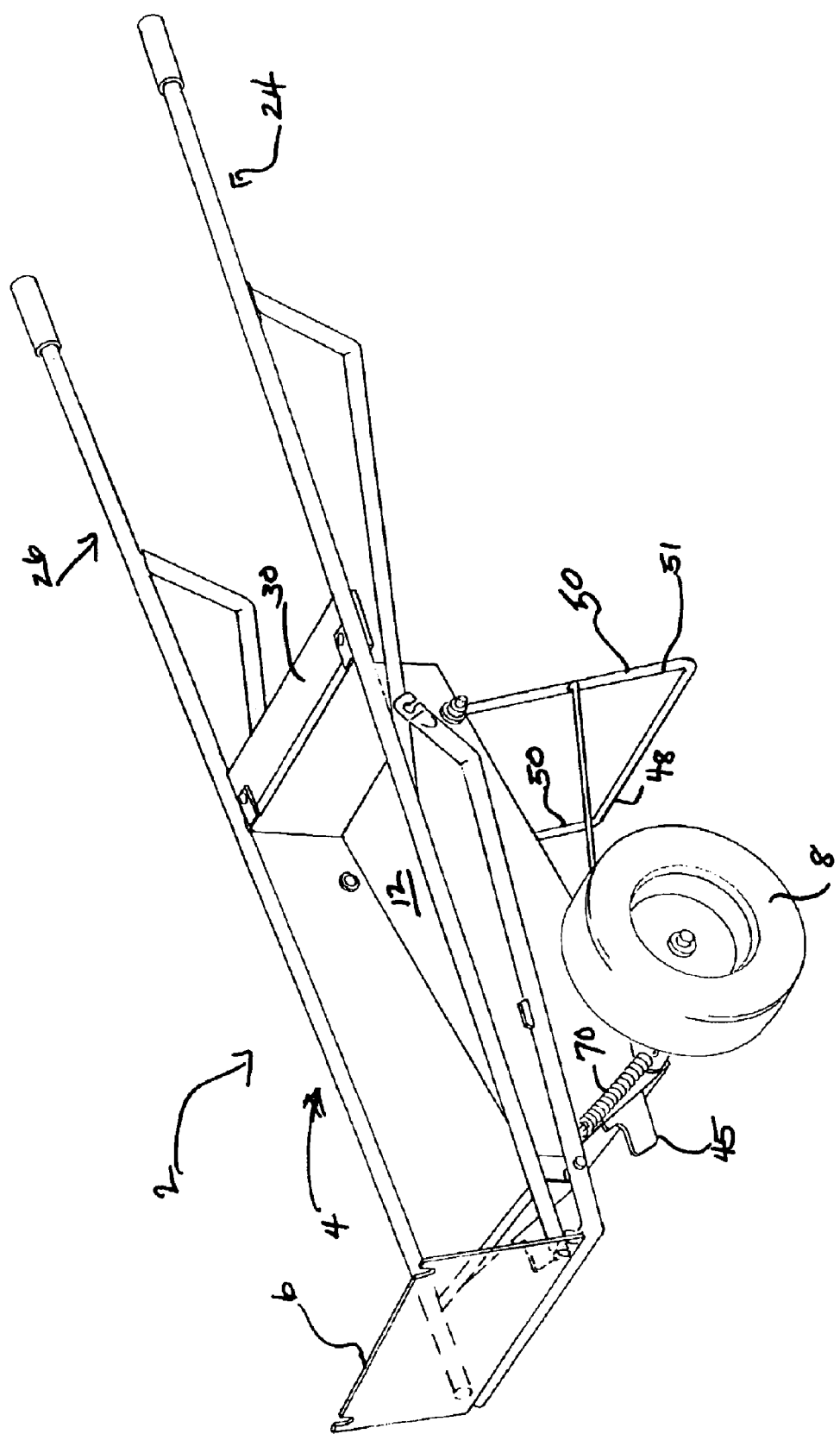
FIG. 3 is a perspective view of the dolly with the wheels moved to allow use of the hand truck in a wheelbarrow mode.
Figure 4:
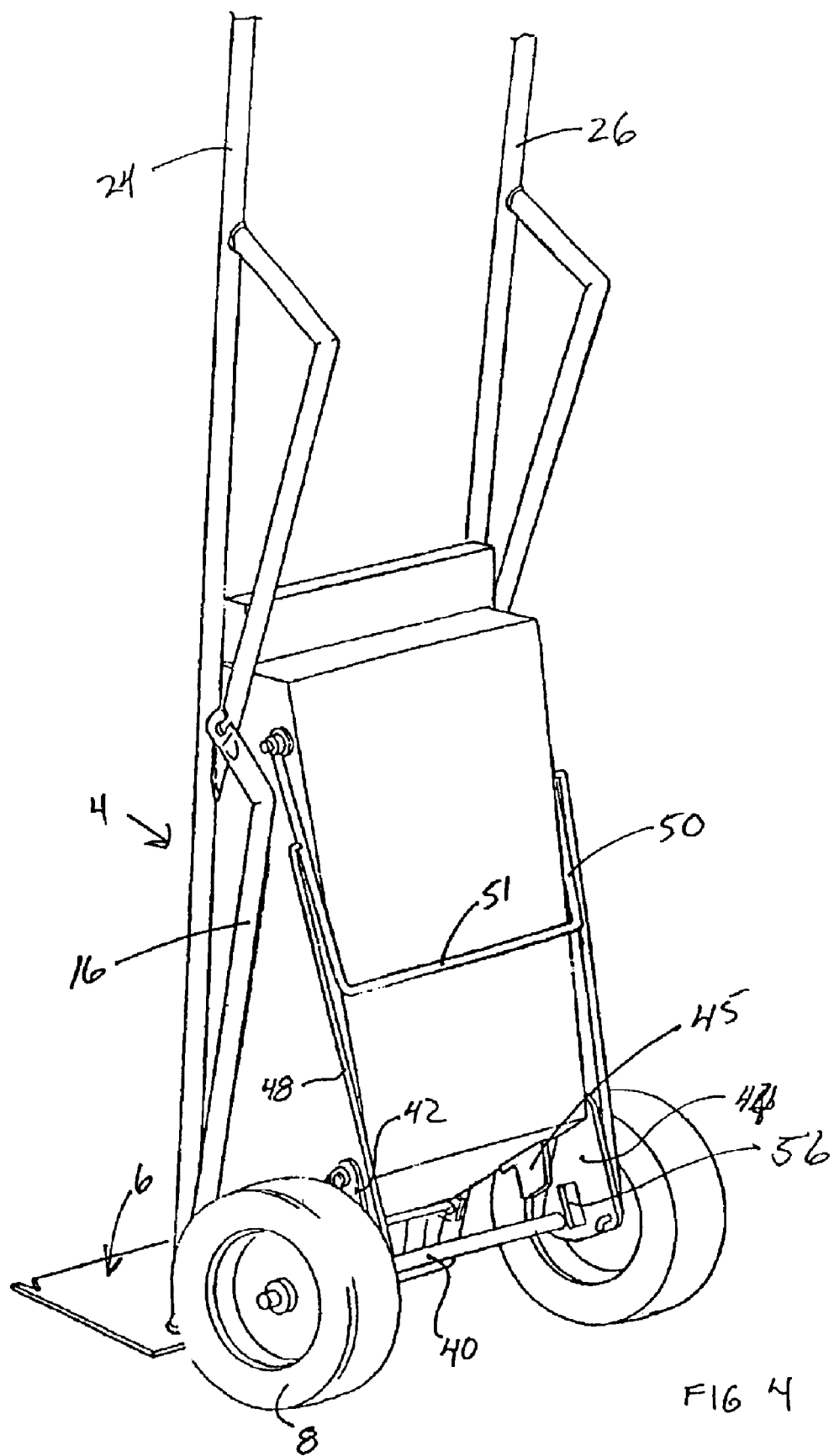
FIG. 4 is a rear view of the hand truck with the wheels in the hand truck mode.
Figure 7:
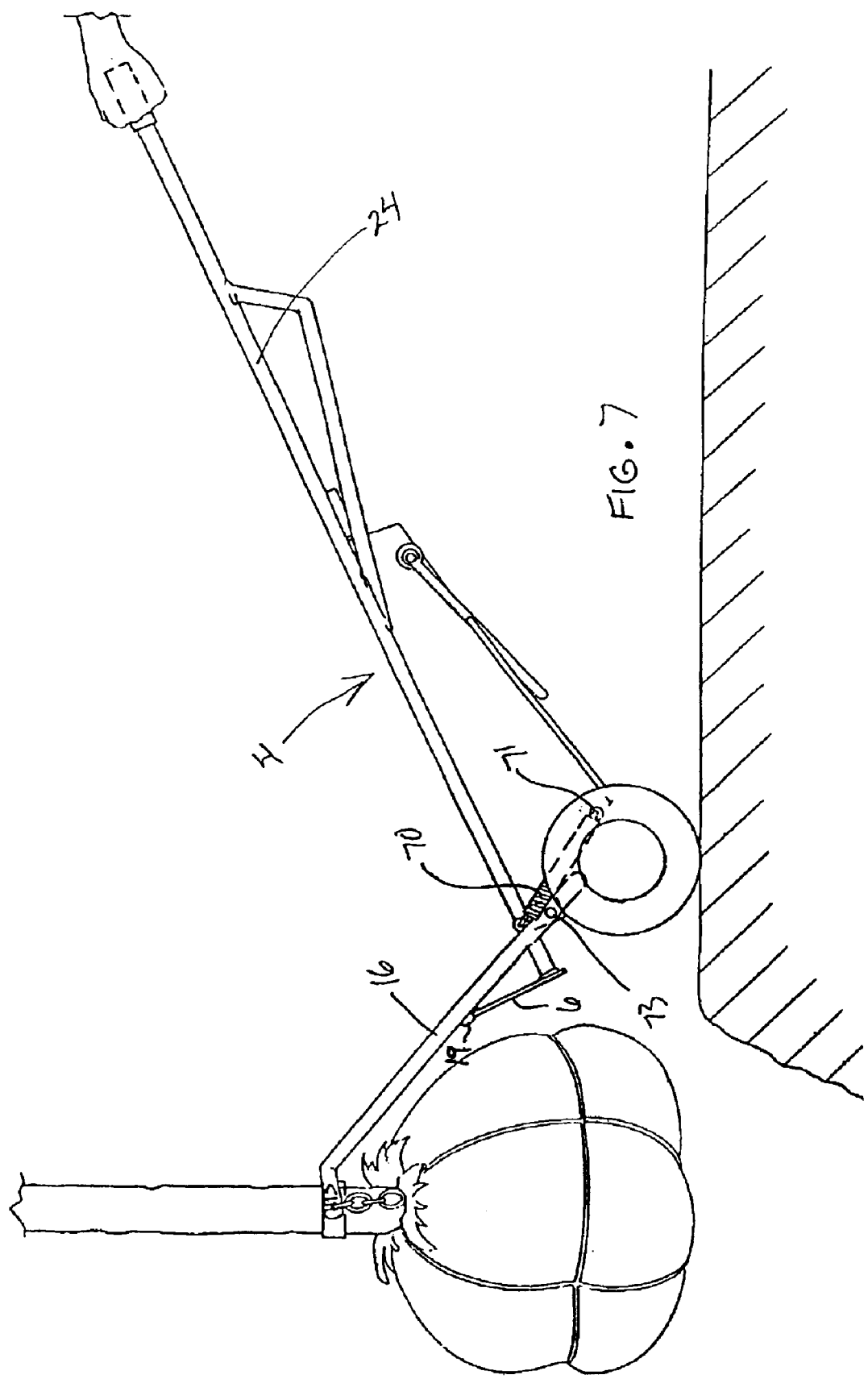
FIG. 7 is a side view of the hand truck with the lifting arms moved forwardly and supporting a load at a free end thereof.
Figure 8:
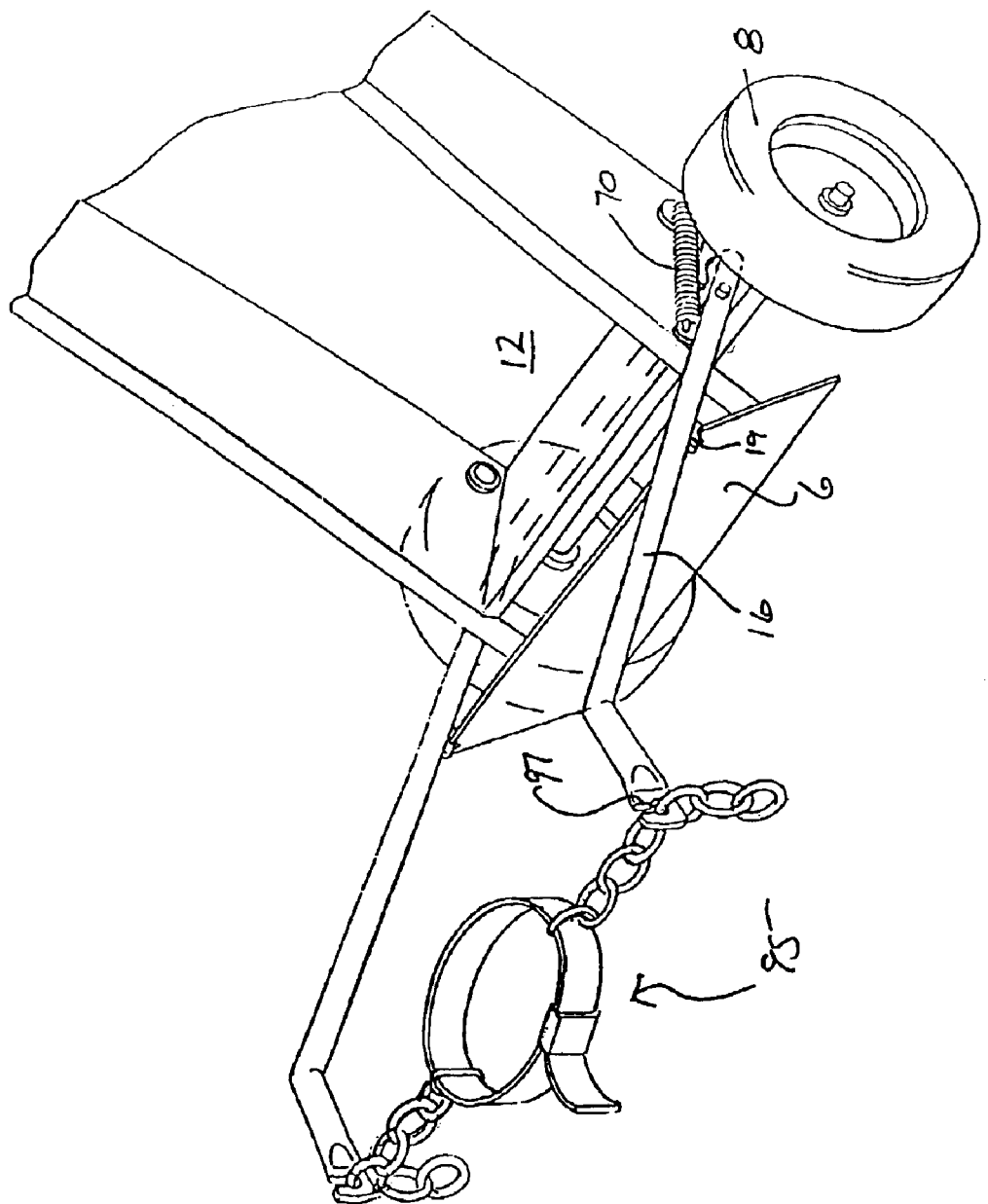
FIG. 8 is a partial perspective view showing the support of the lifting arms on the support plate of the frame.

The multi purpose hand truck as shown in FIGS. 1, 3 and 7 has three separate and distinct modes. The hand truck as shown in FIG. 1 is the conventional hand truck mode where the hand truck 2 has a vertical frame 4 with a support plate 6 provided at the base of the hand truck and a pair of wheels 8 and 10 on either side of the frame and adjacent to the support plate. Boxes, refrigerators or other items can be moved by sliding of the plate 6 beneath the load and with the load contacting the vertical frame 4. If desired, straps can also be used to secure the load to the hand truck. The vertical frame 4 has extending handles 24 and 26 which provide additional leverage for tilting of the hand truck and supporting the load against the frame 4. This is a standard use of a hand truck and it is normally the most common use for hand trucks.

The multi purpose hand truck 2 shown in FIG. 3 is in the wheelbarrow mode. The vertical frame 4 is now generally horizontal. The frame diverges slightly towards the extending handles 24 and 26 to provide space between handles 24 and 26 to allow a person to stand between the handles, in the manner of a conventional open topped wheelbarrow. The hand truck includes a load carrying container 12 within the frame to function in the manner of a conventional wheelbarrow. This container can be made of metal and inserted in the frame or welded thereto or it can be a reinforced plastic or molded material. As will be more fully explained, the wheels 8 and 10 are moveable rearwardly by a control linkage and are generally positioned below the cavity 12. Part of the linkage forms the support legs for the wheelbarrow.

Preferably, the container 12 terminates approximately intermediate the combined length of the frame 4 and the handles 24 and 26 and a wooden board 30 extends between the frames. This board provides a support for one end of the container 12 and also provides a support surface for an outboard motor as will be more fully described in later drawings.

The movement of the wheels 8 and 10 can be best understood from a review of FIGS. 3, 4, 5 and 6. The wheels are mounted on shaft 40 which passes through the appropriate ports in the triangular members 42 and 44. These triangular members are pivoted to the hand truck at pivot point 46. The triangular plates 42 can move from the hand truck position shown in solid lines in FIG. 5 to the wheelbarrow position shown in dotted lines in FIG. 5.

Figure 5:
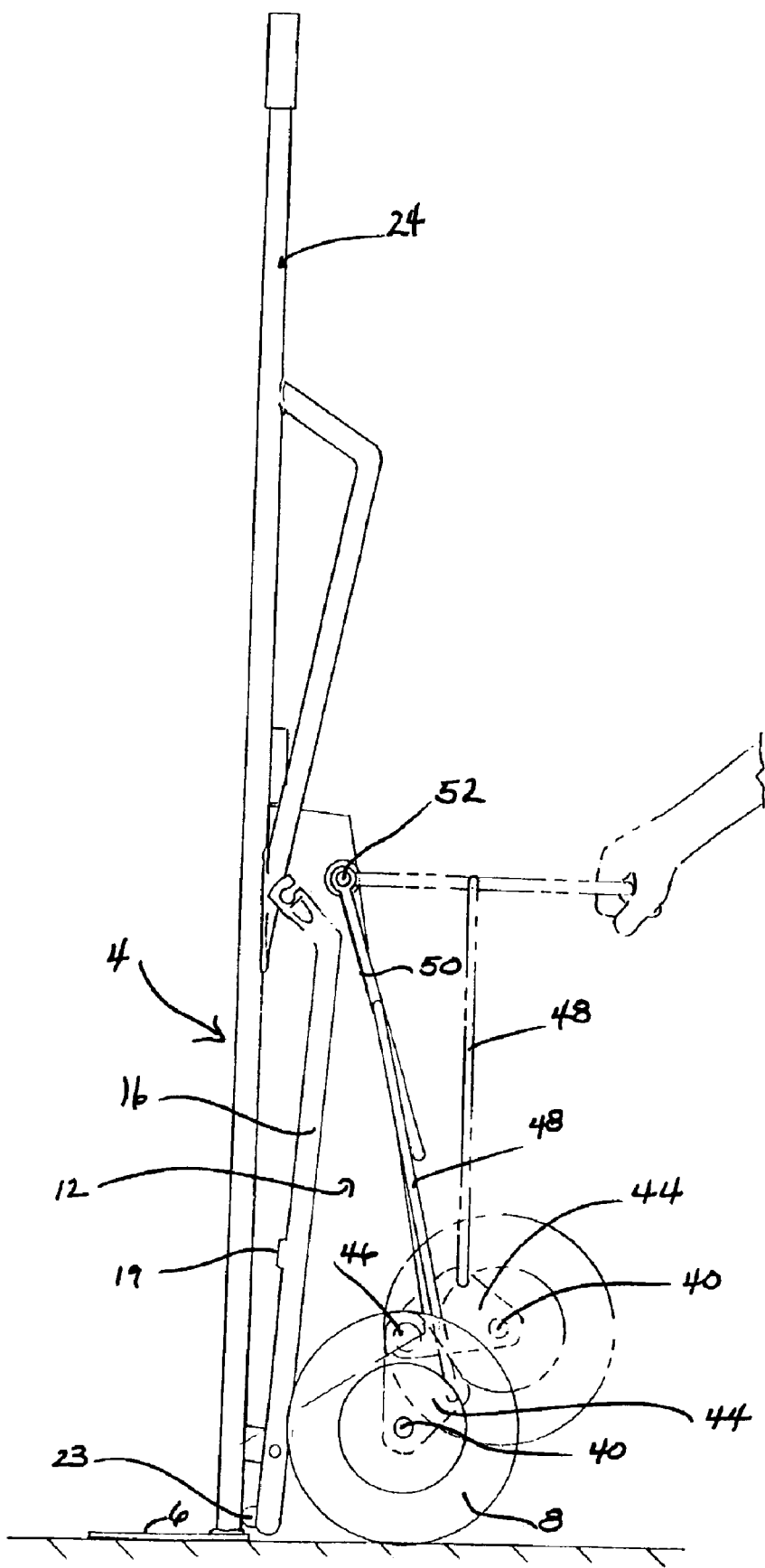
FIG. 5 is a side view of the multi purpose dolly with the wheels being moved from a hand truck position to the wheelbarrow position.
Figure 6:
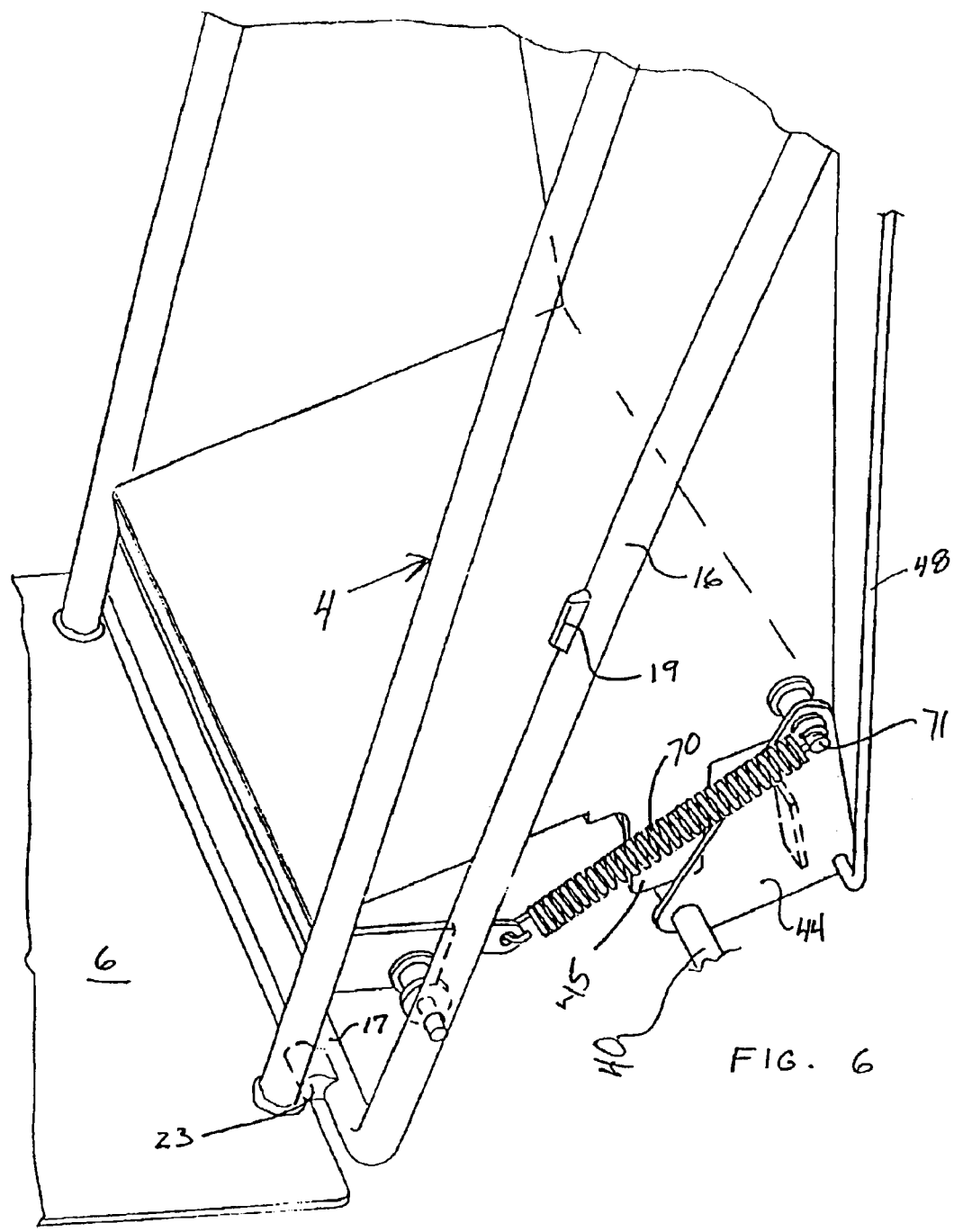
FIG. 6 is a partial perspective view showing details of the linkage used to support the wheels of the hand truck and also showing details of the mounting of a pair of lifting arms on either side of the hand truck frame.

Each of the triangular plates has a control arm 48 attached thereto which is also pivotally secured to the leg member 50 intermediate its length. The leg member 50 is pivoted at 52 to the hand truck. The linkage 48 when the wheel is in the hand truck position of FIG. 5 forms an over centred type latch and the wheel 8 remains locked in the hand truck position. To shift the wheels to the wheelbarrow position, the user grasps the pivoting legs 50 and pulls upwardly as shown in FIG. 5. This causes pivoting of the triangular plate 44 about pivot point 46 through the center point and movement of the wheels rearwardly beneath the cavity 12. The triangular plates 44 and 42 each include a stop face 56. These act as stops positioning the wheels in the wheelbarrow orientation of FIG. 3. The weight of the hand truck on its own maintains the wheels in the position of FIG. 3 during use and as such it also maintains 50 pivoting legs in the position of FIG. 3. Thus, the hand truck has been converted to a wheelbarrow having two wheels either side of the container 12. The wheelbarrow is converted back to the hand truck, merely by tipping of the wheelbarrow on end and movement of the legs to the position of FIG. 4. The linkage effectively forms an over center linkage.

The movement of the wheels between the two positions has been described with respect to the control linkage. Other arrangements for locking the wheels in two or more positions are possible and movement of the wheels by means of the control linkage is only the preferred embodiment.

The foldable legs for the wheelbarrow mode could operate independently of the wheels. For example, each leg could be pivotally movable from a storage to an in use position.

FIG. 5 also illustrates a further use of the hand truck 2 where a load normally moved in the hand truck mode is carried in the wheelbarrow mode. This is accomplished by initially placing the load on the support plate 6 and holding of the load by straps or other means against the frame 4. The wheels of the hand truck are released as the dolly is initially tipped rearwardly. Further tipping of the frame causes the wheels to move to the wheelbarrow position. The base of the frame 4 and the wheels allow the hand truck to be stable or self supporting with the frame at an angled position. The leg members 50 are well above the ground. The cross connecting segment 51 can be used as a handle to pull the linkage rearwardly past the center point as the hand truck is tilted rearwardly. The load is now supported on the hand truck and the handles are pushed downwardly to allow transport. Once the user arrives at the desired location, the hand truck can tip upwardly until the front of the frame contacts the ground. It can stay in this position until the load is to be unloaded. To unload, the user merely tips the hand truck forwardly and the wheels automatically return to the hand truck position and lock in the over center position.

Therefore, the hand truck can be used in the normal hand truck mode or it can be used in a modified hand truck mode by allowing the wheels to move rearwardly as the hand truck is tilted rearwardly. This provides an in use conversion of the hand truck from a standard hand truck mode to a modified hand truck wheelbarrow mode. This feature is useful in moving large items such as air conditioners. The storage at the angled position allows the load to be maintained on the hand truck in a position where it can easily be moved in contrast to a conventional hand truck. This arrangement can be used without the wheelbarrow capability. For example, a dedicated hand truck which is convertible to this second in use position is desirable for many delivery or moving applications.

Furthermore, once the load is on the frame, and the wheels moved rearwardly, the hand truck can be used in the wheelbarrow orientation. The legs 50 can support the hand truck and any load applied thereto.

Movement of the wheels rearwardly changes the balance point of the hand truck. The hand truck with the wheels moved rearwardly and supported by the front edge of the frame, is stable for most loads. Tilting of the hand truck rearwardly initially requires a downward load on the handles until a balance point is reached. Further, movement past the balance point requires a user applied upward force on the handles. The force the user must apply is more desirable due to the changing geometry and change in the angle of the frame relative to the load.

A further embodiment is shown in FIG. 7. The lifting arms 16 are pivotally secured to the hand truck and are moveable against spring bias to a load carrying position shown in FIG. 7. In this case, the rear connecting bar 17 of the arms 16 engage the downwardly extending flanges 45 on the surface of the load cavity 12 and also engage the front edge of the support plate 6. Notches 11 have been provided in the support plate 6 and engage complimentary members 19 on the bottom surface of the lifting arms 16. The lifting arms 16 are pivotally secured adjacent the base of the frame such that the handles 24 and 26 of the hand truck provide considerable mechanical leverage for lifting of the generally heavy load suspended in front of the hand truck. The hand truck may be moved towards the appropriate planting location and the ball of the tree lowered into the hole by allowing the handle to move upwardly.

As shown in FIG. 7, a spring 70 is connected to the lifting arms 16. The opposite end of the spring is attached to the pivot position 71 which supports one of the plates 42 or 44. The spring 70 provides a bias to bring the lifting arms back to the vertical orientation shown in FIG. 1. The spring is extended as the arms to move to the load transfer position of FIG. 7 and provides a bias to return the arms to the storage position. A rubber stop 23 engages the frame and limits movement of the arms.

In FIG. 7, the arms are engaging the end of the plate and are also engaging front face of the cavity 12. The arms pivot about point 73 however, the load is effectively being transferred to the frame though the cavity 12 and the support plate 6. It has been found that this arrangement is very effective for lifting of heavy loads which are to be maintained in a generally vertical orientation. As can be appreciated the chain allows pivoting of the load. The chain and belt arrangement allows suspension of different loads. The arms 16 include "U" shaped slots for engaging the chains at different positions. This lifting arrangement also has application for large cement pots with soil and flowers or plants which are to be moved.

To use the lifting arms 16, the hand truck is brought up to the item to be lifted and the truck is stood vertically a short distance from the item such as a flower pot. The chain and belt arrangement 95 is secured to the item. The arms 16 can then be lowered by hand to be located on either side of the item. The chains can then be releasably attached to the "U" shaped slots 97. The hand truck may then be pivoted until the arms 16 engage the support plate 6. Further lifting of the hand truck will start to lift the item while allowing it to pivot and maintain a vertical orientation given the weight is generally symmetrical with a low center of gravity (flower pot, tree with root ball, etc). The lift is from either side of the item leaving the center unobstructed which is particularly advantageous for nursery stock and in use flower pots. The mechanical advantage can be increased by extending the handles 24 and 26 or decreasing the arms 16. A 3 to 1 ratio is easily provided and found to be satisfactory.

It is also possible to use the lifting arms with the wheels moved to the rearward or second position. Some Mechanical advantage is lost, however, the angel of the frame has changed and may be more desirable to maneuver, or easier for the user.

FIG. 10 shows a further use of the hand truck. Clip members 92 secured to the cross board 30 are used to engage an interior edge of the recyclable compost bag 100. The bottom of the bag 10 is supported by the support plate 6. Any refuse bag or container can be held in this manner. FIG. 9 shows the hand truck being used for supporting the outboard motor 110. The support plate 6 provides a positive support to maintain the cart in the vertical orientation for storage. The center of gravity of the motor is generally above and aligned with the board 30.

Figure 12:
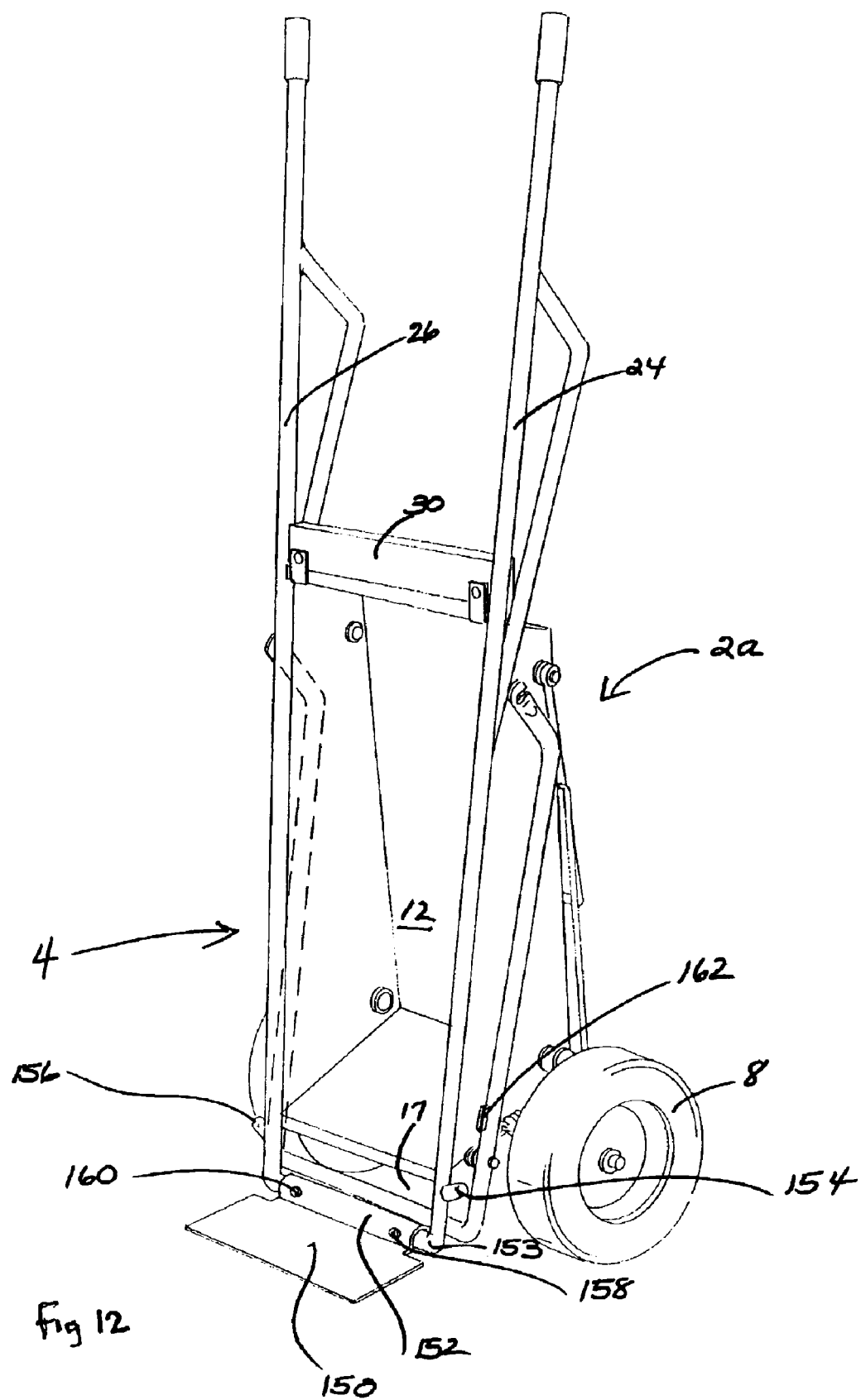
FIG. 12 is a perspective view of an alternate embodiment.

FIG. 12 illustrates an alternate embodiment having a pivoting dolly plate 150 movable from the operating position to a storage beneath and to the exterior of the local cavity 12. The dolly plate 150 has a sleeve bearing 152 mounted on tube 153 which forms a lower portion of the frame of the hand truck. Carriage bolts 158 and 160 pass through holes in the tube 153 and lock the dolly plate in either the operating position shown in FIG. 12 or a storage position where the dolly plate is rotated counter clockwise and positioned beneath the hand truck. Carriage bolts 158 and 160 are removable to allow the dolly plate to be locked in one of the two positions.

Stub arms 154 and 156 are attached to vertical portions of the frame 4. Thus, the upward angling of stub arms 154 and 156 maintain engagement of the arms when a load is applied to the arms.

The pivoting plate 150 is moved to the storage position leaving the front of the hand truck unobstructed by rotating counterclockwise and moving the lifting arms 16 forwardly to allow the dolly plate to clear the connecting bar 17 which has moved rearwardly.

It is also possible to merely have a detachable dolly plate which is releasably secured to the hand truck. Preferably the dolly plate is stored on the hand truck ready for attachment.

Figure 13:
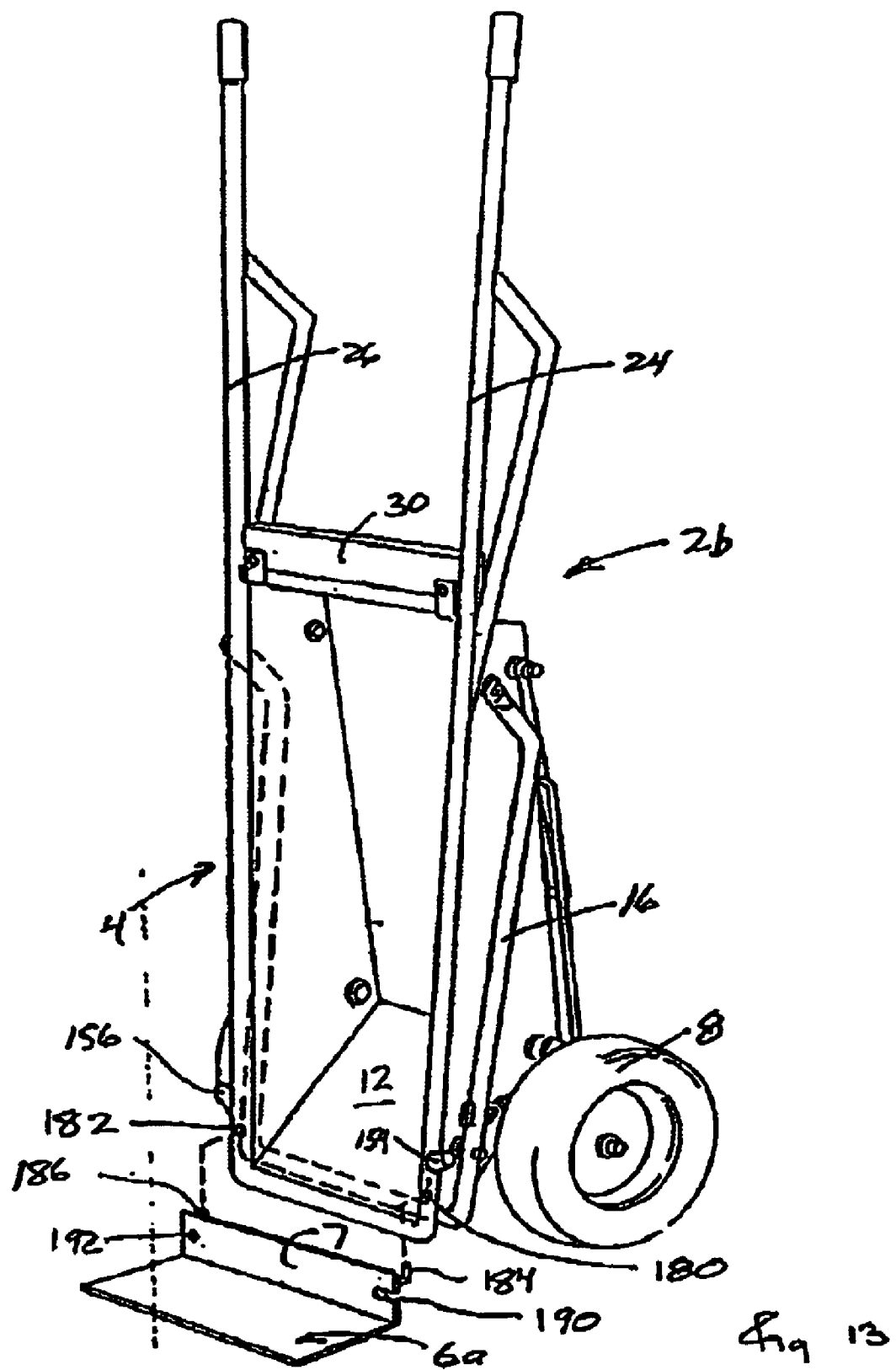
FIG. 13 is a front perspective view of the dolly with a removable support plate.

FIG. 13 shows the mobile hand truck 2b where the plate 6a is removably secured to the base of the frame 4. Two holes 180 and 182 are provided on the frame and receive hook extensions 184 and 186 extending from the rear edge 188 of the flange 7. The support plate is secured by tilting thereof, relative to the frame 4 and inserting the hook extensions 184 and 186 into the holes 180 and 182. The support plate 6a is then pivoted to the in use position.

FIG. 13 also shows how the container 12 can extend to the cross member of the frame.

Figure 14:
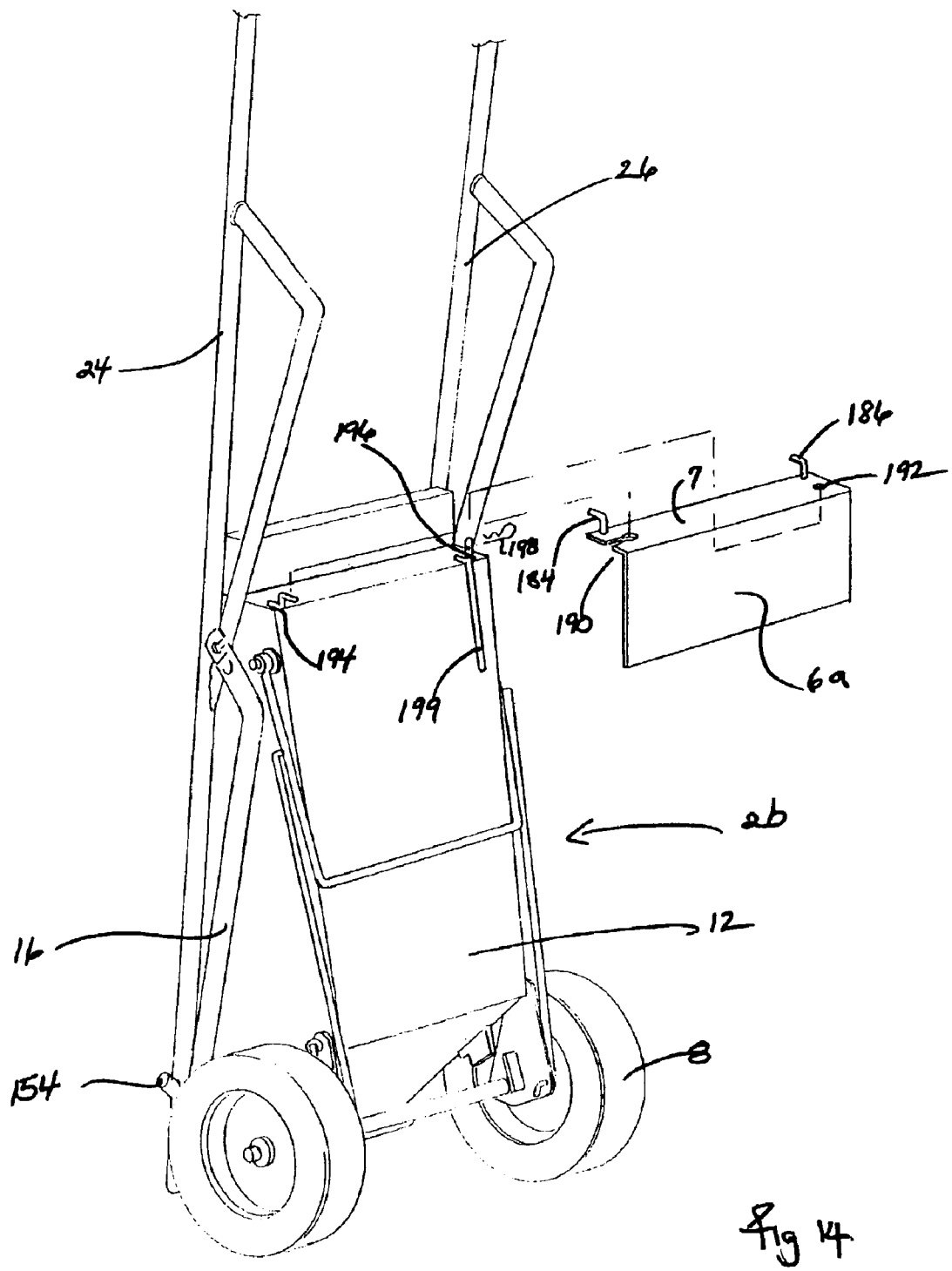
FIG. 14 is a rear perspective view illustrating storage of the support plate.

FIG. 14 shows storage of the plate 6a to the back of the wheelbarrow container 12. The support plate includes a notch recess 190 and a hole 192 on the flange 7. The notch recess is placed under the rearwardly extending hook 194 which then overlaps with the flange 7. The rearwardly extending hook limits pivoting movement of the stored support plate when the dolly is in use as a wheelbarrow or other lifting device. The hole 192 is aligned with and inserted on the stud 196. Stud 196 has a hole drilled therethrough for receiving the safety pin 198. Elongate projection 199 serves to space the support plate 6 slightly off the bottom of the container 12. This is preferable if the container is painted. The elongate projection 199 can be shaped as a wedge to provide an interference fit.

The removable dolly plate or the pivoting or storing dolly plate is desirable when the hand truck is primarily used as a vertically storing wheelbarrow and is only intended to be used as a hand truck occasionally.

Other arrangements for releasably securing and/or movement of the dolly plate between an operating position and a storage position are possible and within the scope of the present invention.

The multi purpose hand truck 6 quickly converts from the wheelbarrow mode of FIG. 11 to the hand truck mode of FIG. 1. The wheelbarrow mode of FIG. 11 functions in a comparable manner with conventional wheelbarrows with the exception that it can be easily stored vertically as a hand truck. Furthermore the wheels 8 and 10 in the hand truck mode are positioned below and within the depth of the cavity 12 providing further efficiency in storage. Many homeowners need a wheelbarrow but the storage thereof is difficult. The present design provides an effective solution to this problem.

The multipurpose hand truck 6 can be used as a conventional hand truck or dolly and has a further lifting and transport arrangement using the lifting arms 16. Movement of the wheels rearwardly and the cavity 12 allows it to be used as a wheelbarrow. Although all three functions are desirable in the single design as shown any two of the functions provide significant improvements over the prior art. For example, the hand truck and lifting arms can be used with existing hand trucks without the wheelbarrow function. In this case, the wheels do not need to move and the design is simplified. Other arrangements for securing of the lifting arms are also possible.

A wheelbarrow which can easily be stored is also possible with the present invention. Arrangements other than the support plate 6 can be used for rendering the arrangement stable in the vertical storage orientation. For example, the wheels and an end portion of the frame can form a stable base for storage of the wheelbarrow vertically. A wheelbarrow and lifting arm structure provides a structure particularly suited for gardening and lifting applications around the home.

Figure 15:
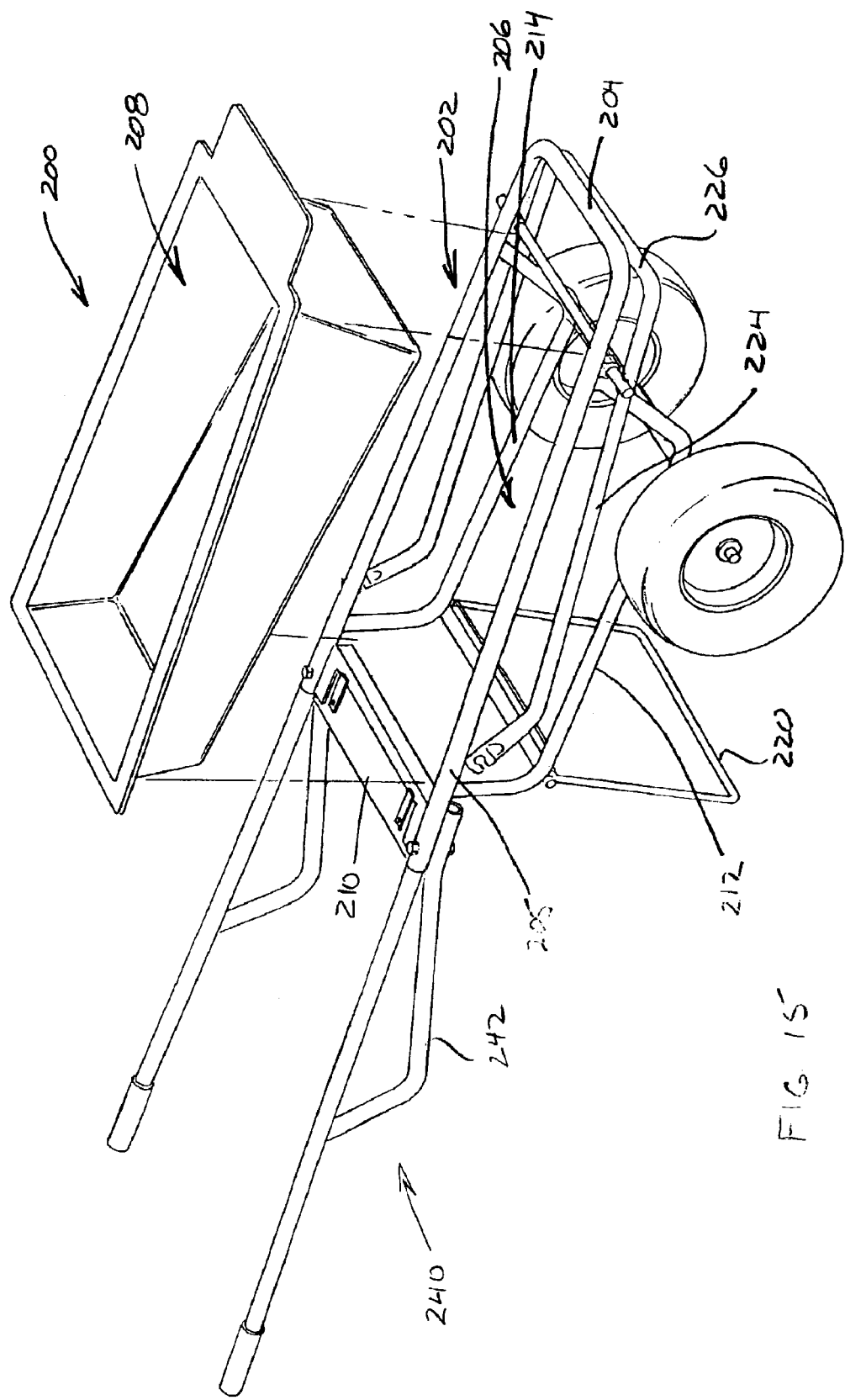
FIG. 15 is an exploded perspective view of a dolly.
Figure 16:
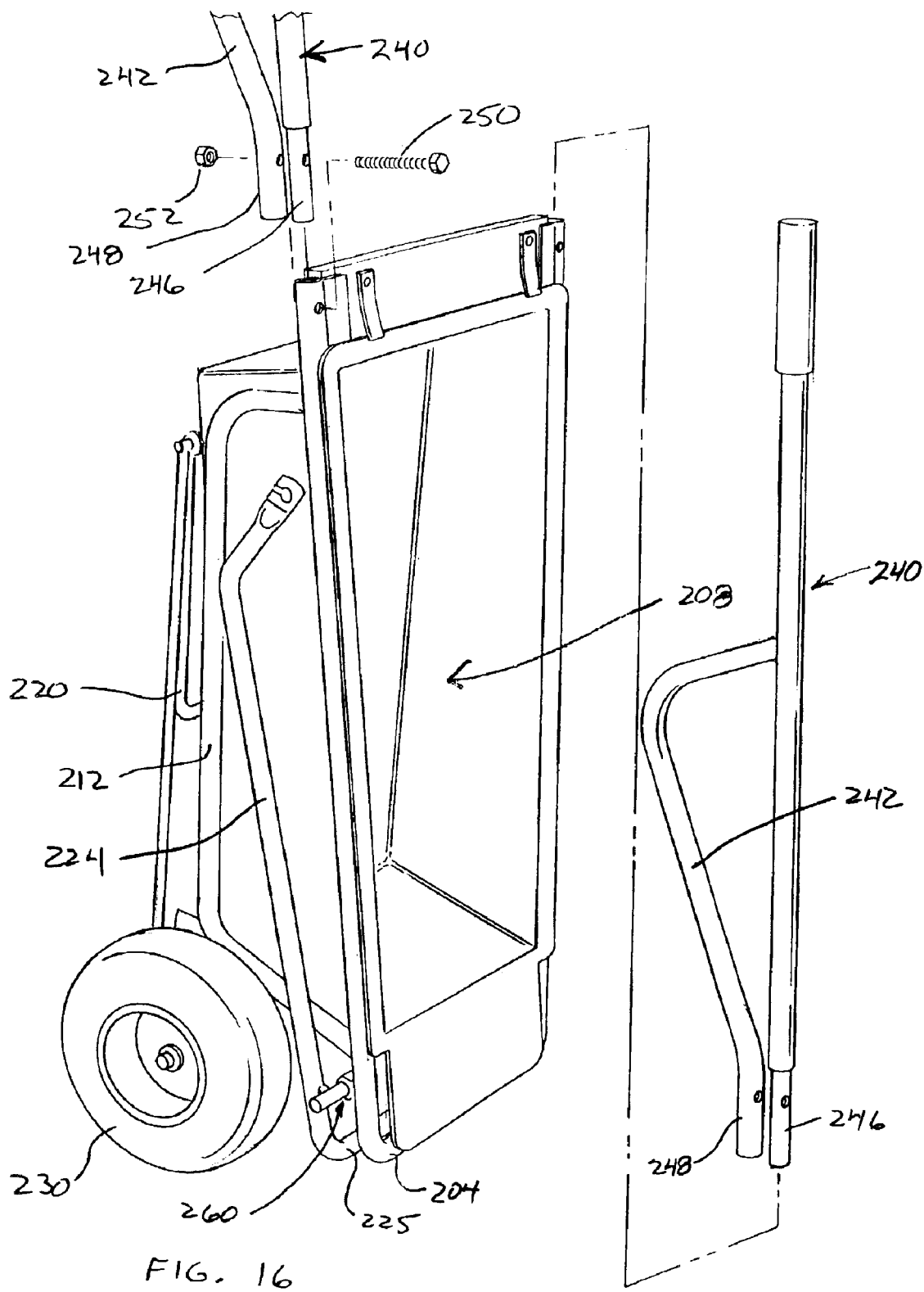
FIG. 16 is a perspective view showing securement of the handles to the dolly.

The vertical storing wheelbarrow 200 of FIGS. 15 and 16 is similar to the earlier structure, however, a frame system is used for supporting of the wheels and the leg linkage, as well as the lifting arms, independent of the wheelbarrow container 208. In the earlier structure, the wheelbarrow container formed part of the structural support system.

The vertical storing wheelbarrow 200 has a U-shaped frame 202 having a front edge 204 which cooperates with a connecting portion 210 to define an open center section 206 for receiving of the flanged container 208. The flanged contained 208 forms the wheelbarrow container mechanically secured to the U-shaped frame 202. The container 208 preferably is an injection molded plastic component or a metal component. Thus, the container 208 can be of various materials and designs as it is supported within the frame and essentially only performs the known function for a wheelbarrow container. The U-shaped frame 202 is defined by the front edge 204 having integral tube arms 205 either side thereof. The tube arms 205 are open at the free ends thereof for receiving the male portion 246 of the removable handles 240. Each of the removable handles 240 includes a downwardly extending secondary handle 242. The removable handles are secured to the tube arms 205 by a mechanical securement defined by the bolt 250 passing through the tube arm 205, the male portion 246 and the underlying support portion 248 of the secondary handle 242. This arrangement provides a strong connection of the removable handles 240 to the U-shaped frame 202, however, other mechanical securing arrangements can be used. Two mechanical fasteners can be used for securing each of the handles to provide a rigid connection.

The U-shaped frame 202 includes opposed downwardly extending U-shaped arms 212 and 214 secured either side of the U-shaped frame. These downwardly extending U-shaped arms 212 and 214 provide the structural securement for the wheel linkage shown in the earlier figures as well as the leg linkage 220. These opposed U-shaped arms are securely fastened to the U-shaped frame 202 and form the stop surfaces for the leg linkage 220 as well as the wheels 230. In addition, the U-shaped frame 202 has attached thereto the pivoting connection 260 for the lifting arms 224. The lifting arms are connected adjacent the forward end of the wheelbarrow by a connecting portion 225 which will strike the downwardly extending U-shaped arms 212 and 214 when the arms are moved to the lifting position.

From the above, it can be appreciated that the vertical storing wheelbarrow 200 has a structural frame for supporting the wheels 230 and the pivoting linkage thereof which allow the wheels to move from the storage position shown in FIG. 16 to the wheelbarrow operating position of FIG. 15. The wheels in the position shown in FIG. 16 also allow the device to be used as a conventional dolly truck when a lifting plate is provided as shown in the earlier figures.

Details of the wheel linkage have not been fully shown in FIGS. 15 and 16 but are similar to the wheel linkage as shown in the earlier figures.

FIG. 16 clearly shows the assembly of the removable arms 240 to the wheelbarrow frame and additionally illustrates the position of the wheels in the storage position. The wheels 230 in the storage position as shown in FIG. 16, cooperate with the front edge 204 of the U-shaped frame 202 to provide a stable support base for storing the wheelbarrow in the vertical storage position. As can be appreciated from FIG. 16, the vertical storage position of the wheelbarrow is space efficient and preferably only requires a depth of about 16 inches. This 16 inch depth is associated with the wheelbarrow having a capability of carrying sufficient material for most household applications. The efficient vertical storage position is also beneficial with wheelbarrows of additional capacity. The design as shown in FIGS. 15 and 16 is appropriate for a convertible device which can also be used as a dolly and has the additional lifting arms. Additional capacity of the wheelbarrow can be achieved by widening of the frame and/or increasing the depth or length of the frame.

The present design uses two wheels either side of the wheelbarrow which are removable from the storage position as shown in FIG. 16 to an operating position as shown in FIG. 15. It is also possible with this design to use a single rotating wheel centrally disposed. The wheelbarrow would still provide efficient vertical storage and a triangular support base would be defined by the front edge of the wheelbarrow such as the connecting portion 204 and the single wheel which would be centrally disposed. The container 208 could be appropriately recessed to accommodate the wheel movement. The use of two wheels either side of the structure allows the device to work in its other modes more effectively and provides additional stability. The wheels in the storage position continue to function and by tilting the wheelbarrow, it can easily be moved into a desired storage location.

Although various preferred embodiments of the present invention have been described in detail, it will be appreciated by those skilled in the art that variations may be made without departing from the spirit of the invention or the scope of the appended claims.

What is claimed is:

1. A convertible wheelbarrow comprising an elongate frame with a handle arrangement extending from one end of said frame, a movable wheel arrangement pivotally secured to said frame at an end thereof opposite said handle arrangement, an open topped container secured within said frame and extending behind said frame, and a leg support arrangement space rearwardly of said movable wheel arrangement, said leg support arrangement being movable between a storage position with the leg support arrangement being adjacent said container and a load support position where said leg support arrangement extends at an angle away from said container and wherein said wheel arrangement is movable between a first position immediately adjacent said end opposite said handle arrangement where said wheelbarrow is self supporting in a vertical orientation of said frame to an in use second position where said frame is at an angle to a support surface and said wheel arrangement is spaced from said end opposite said handle arrangement and moved towards said handle arrangement and beneath said open topped container; wherein said wheelbarrow is self supporting in a space efficient generally vertical orientation of said frame with said wheel arrangement in said first position and said leg arrangement in said storage position and said wheelbarrow is convertible to a working configuration with said wheel arrangement in said in use position and said leg support arrangement in said load support position, wherein said leg support arrangement is a pair of foldable legs and said wheel arrangement includes a pair of wheels pivotally secured on opposite sides of said frame wherein said foldable legs are part of a control linkage connected to and controlling the position of said wheels, and wherein said control linkage engages a stop member attached to said frame.

\* \* \* \* \*